May 30, 1961

W. S. WINTON 2,986,402

HEIGHT ADJUSTABLE ROTARY LAWN MOWER

Filed April 30, 1959

INVENTOR
WILLIAM S. WINTON

BY Chapin & Neal

ATTORNEYS

May 30, 1961 W. S. WINTON 2,986,402
HEIGHT ADJUSTABLE ROTARY LAWN MOWER
Filed April 30, 1959 2 Sheets-Sheet 2
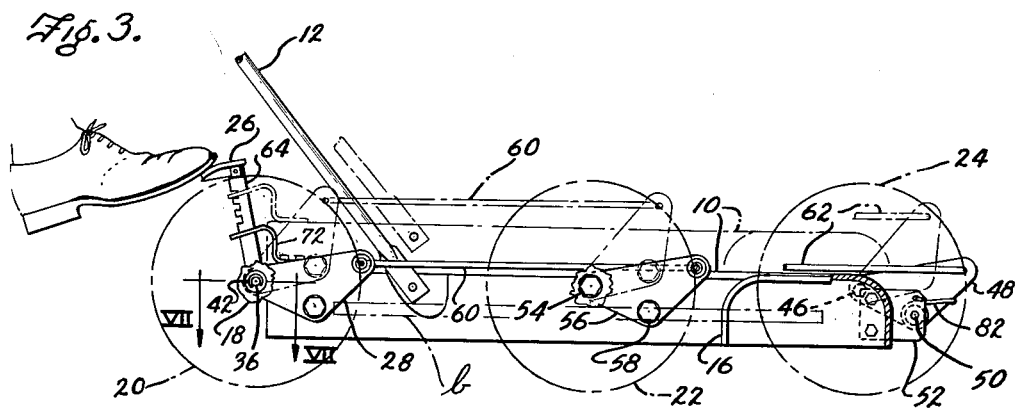
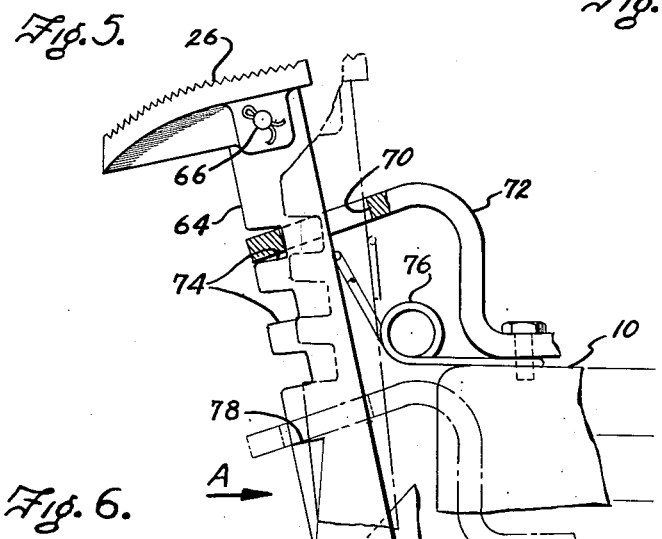
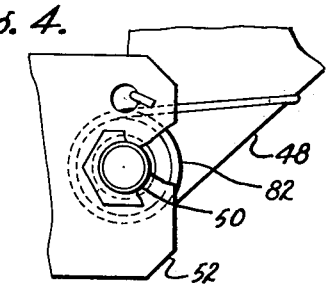
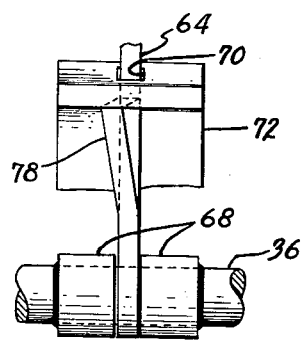
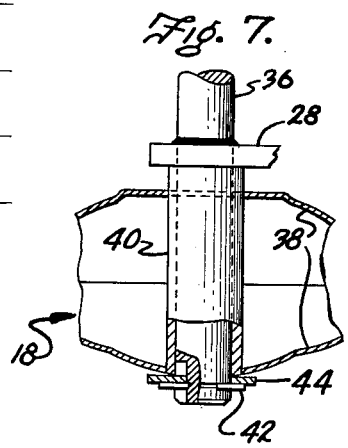
INVENTOR
WILLIAM S. WINTON
BY Chapin & Neal
ATTORNEYS United States Patent Office 2,986,402
Patented May 30, 1961

2,986,402

HEIGHT ADJUSTABLE ROTARY LAWN MOWER

William S. Winton, Chicopee Falls, Mass., assignor to Savage Arms Corporation, Chicopee Falls, Mass., a corporation of Delaware Filed Apr. 30, 1959, Ser. No. 810,138

9 Claims. (Cl. 280—43.13)

The present invention relates to power lawn mowers of the type having a rotary blade revolving about a vertical axis and more particularly to improved means for varying the height of the blade relative to the surface over which the mower is advanced.

Rotary type mowers as herein contemplated are further characterized by a housing overlying the revolving blade and on which the power unit for rotating the blade is mounted. A plurality of wheels, generally four in number, are mounted on this housing so that it may be readily propelled or guided by a handle in the usual fashion. The height at which the mower cuts is of course dependent on the height of the housing relative to the wheels, and in the past it has been common practice to mount the wheels on brackets which may be individually shifted relative to the housing. This is a tedious procedure and has led to the development of means for shifting the housing relative to all wheels simultaneously so as to quickly adjust the mower for the desired cutting height.

The object of the invention is to attain this known end of shifting the housing relative to all its wheels simultaneously and in so doing to provide improved and simplified means for mounting the wheels and obtaining the shifting action whereby the potentialities of rotary power lawn mowers may be more fully realized with greater convenience.

Another object of the invention is to reduce the amount of physical effort required in making such adjustments.

The above and other related objects as well as the novel features of the invention will be apparent from a reading of the following description of the disclosure found in the accompanying drawings and the particular novelty thereof pointed out in the appended claims.

In the drawings:

Fig. 3 is a side elevation of the parts seen in Fig. 2 with portions thereof broken away and in section for clarity;

Fig. 4 is a fragmentary showing on an enlarged scale of the front wheel mounting means seen in Fig. 3;

Fig. 5 is a fragmentary showing also on an enlarged scale of actuating means seen in Fig. 3;

Fig. 6 is a fragmentary view looking in the direction of arrow A in Fig. 5 and showing the relation of parts as they would be with the mower at its lowest cutting height; and Fig. 7 is a section taken on line VII—VII in Fig. 3 and on an enlarged scale showing constructional details.

Figure 1:
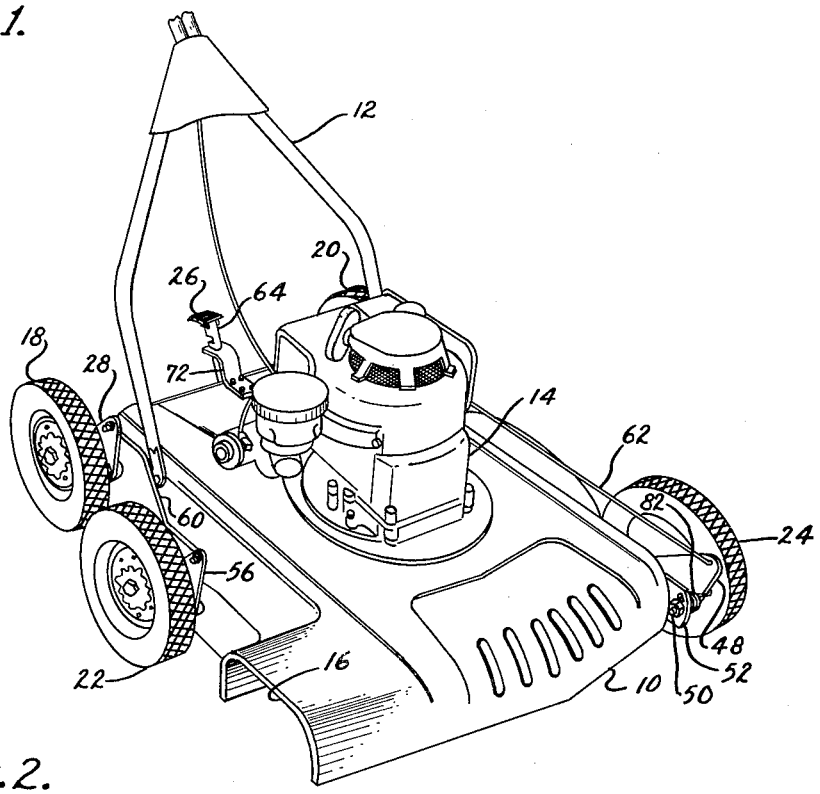
Fig. 1 is a perspective view of a rotary lawn mower embodying the present invention.

The lawn mower seen in Fig. 1 comprises the basic components common to power rotary mowers. Thus there is seen a housing 10 mounted on four wheels which may be propelled by a handle 12. A power unit, in the form of a gasoline engine 14, is mounted atop the housing 10 and drives a rotating cutter blade (not shown in Fig. 1) within the housing, discharging clipping and the like through the outlet 16.

The height of the wheels (designated 18, 20, 22 and 24) relative to the housing 10, of course, controls the height of cut for the mower. The mounting means employed enables the wheels to be shifted simultaneously relative to the housing so as to vary the height of the cutting blade. This adjustment is simply made by pulling up on the handle 12 and stepping on a pedal 26 while shifting the pedal forwardly. In this fashion the housing 10 may be raised and upon a rearward shifting of the pedal 26, locked in any of several incremental positions. To lower the housing 10, it is simply necessary to momentarily shift the pedal 26 forwardly and release it whereupon the housing 10 will automatically be lowered one or more incremental steps.

Figure 2:
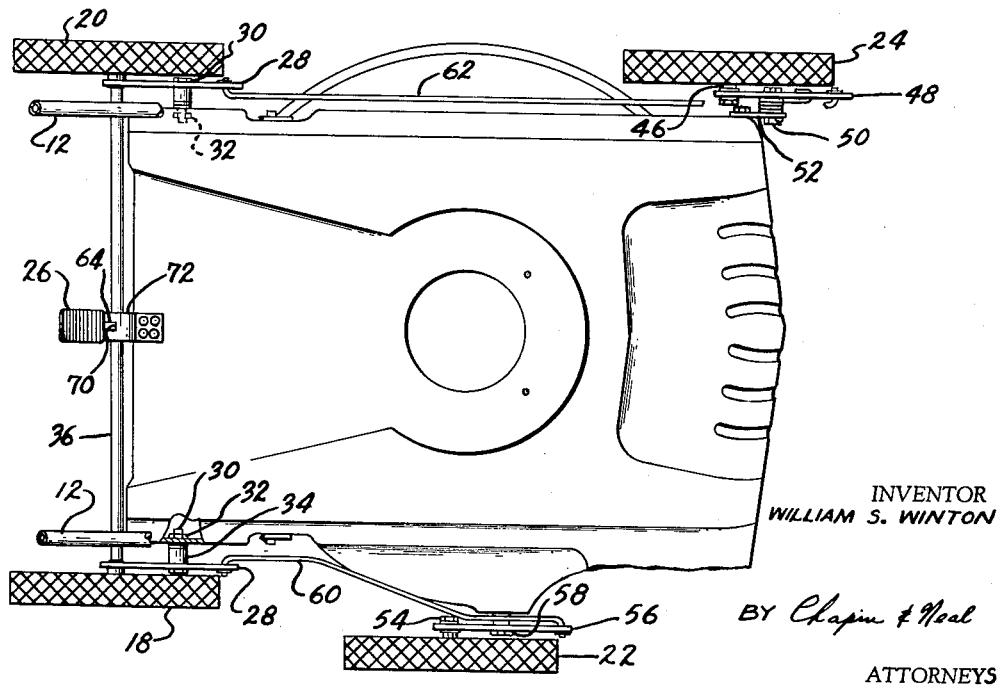
Fig. 2 is a plan view of the mower housing seen in Fig. 1 with the power unit removed.

The wheel mounting means comprises parallel linkage means for pivotally mounting each of the wheels relative to the housing 10. Thus lever plates 28 (Figs. 2 and 3) are pivotally mounted on aligned shoulder screws 30 on opposite sides of the housing 10 adjacent its rear end. The screws 30 are held in place by nuts 32 while the lever plates 28 are spaced from the housing 10 by collars 34. A shaft 36 extends between the lever plates 28 and projects beyond each plate to serve as a support for the wheels 18 and 20. Preferably the plates 28 are welded to the shaft 36 (Fig. 7) for greater rigidity. The wheels 18 and 20 each comprise sheet metal disks 38 (Fig. 7) welded to a sleeve 40 which is rotatably received by the shaft 36. Each sleeve 40 projects into abutting relation with the adjacent lever plate 28, and the wheel is held in place by a snap ring 42 and washer 44.

Wheel 24 is rotatably mounted at the extreme front of housing 10 on a stud 46 (Figs. 2 and 3) in much the same fashion as the wheels 18 and 20 are rotatably mounted. Stud 46 projects from a lever plate 48 which is pivotally mounted on a pin 50 extending from a bracket 52 which projects forwardly from the housing 10. Wheel 22 is similarly mounted, being rotatable on a stud 54 projecting from a lever plate 56 which in turn is pivotally mounted on a screw 58 secured to the housing 10.

At this point it will be noted that the wheels 18, 20, 22 and 24 could be disposed in relative positions other than what is shown. That is, the wheels could be at the extreme corners of the housing or even a single rear wheel could be employed within the broader aspects of the present invention.

The wheels are interconnected by parallel links. Thus it will be seen that an offset link 60 interconnects one of the plates 28 and the plate 56 and a link 62 interconnects the other plate 28 and the plate 48. The pivotal points of connection between the links and the plates, and the plates and the housing as well as the disposition of the wheels on the plates all provides a parallel linkage arrangement which may be readily actuated to shift the wheels and vary the height of the housing 10 as indicated in Fig. 3.

Movement of this parallel linkage is controlled, in part, by the operator through the pedal 26 which is secured to the top of a bar 64 by pin 66 (Fig. 5). The bar 64 is pivotally mounted on the shaft 36 and axially fixed by collars 68 (Fig. 6) welded to the shaft 36 on each side of the bar 64. The bar 64 passes through a slot 70 in a bracket 72 secured to the housing 10. Notches 74 (Fig. 5) are formed in the rear of the bar 64 which is urged into engagement with the bracket 72 by a coil spring 76. One end of the spring 76 bears against the front face of the bar 64 and the other end is confined beneath the bracket 72. The weight of the housing 10 and engine 14 urge the bracket 72 downwardly relative to the bar 64 at all times. This in combination with effect of spring 76 maintains the bracket 72 in any one of three incremental positions provided by the notches 74. A fourth incremental position and a limit stop is provided by a laterally bent portion 78 (Fig. 6) upon which the bracket 72 rests in its lowermost position.

With this described arrangement, the cutting height of the mower may be readily adjusted. Thus when the housing is in its lower position (Fig. 3), it is simply necessary for an operator to place his foot on the pedal 26 and at the same time to pull upwardly and rearwardly on the handle 12. The rearward disposition of the handle 12 facilitates shifting of the bar 64 to the front end of the slot 70 so that the housing 10 is swung upwardly, through the action of the parallel linkage, about the axes of the wheels 18, 20, 22 and 24 which remain relatively stationary. Forward pressure on the pedal 26 maintains the bar 64 in the forward end of the slot 70 (Fig. 4) during upward movement of the housing. At this point it will also be noted that a counter balancing spring 82 is effective on the parallel linkage suspension to partially balance the weight of the engine 14 and the housing 10. More specifically the spring 82 is a torsion spring coiled about the stud 50 with one end engaging a hole in the bracket 52 and the other end engaging the lever plate 48.

When the housing 10 is raised to the desired height, the pedal 26 is shifted rearwardly and one of the notches 74 engaged with the bracket 72 under the influence of spring 76. The mower blade b, indicated in phantom in Fig. 3, is thus set at a desired height.

When it is desired to lower the cutting height of the mower, the handle 12 may be gripped and pulled upwardly to balance the weight of the housing and engine as the pedal 26 is shifted forwardly to disengage the notches 74 from the bracket 72. The handle 12 may then be lowered to bring the blade b to the desired height and the pedal 26 shifted rearwardly to engage the proper notch 74 with the bracket 72. More simply the housing 10 may be lowered by momentarily shifting the pedal 26 forwardly as by the operator giving the pedal 26 a sharp kick. When the pedal is so shifted, the bar 64 is moved forwardly to bring the engaged notch 74 away from the rear portion of bracket 72. The spring 76 immediately urges the bar 64 rearwardly in ratchet fashion and brings the next lower notch 74 into engagement with the bracket 72.

Having thus described the invention, what is claimed as novel and desired to be secured by Letters Patent of the United States is:

1. A rotary power lawn mower comprising a housing on which is mounted a power unit, a pair of rear wheels, a cross shaft rearwardly of said housing on the outer ends of which the rear wheels are rotatably mounted, a pair of lever plates secured to said shaft and pivotally mounted on either side of said housing on the same axis and at a fixed distance forwardly from the axis of said shaft, a front wheel on each side of said housing, a front lever plate on which each said front wheel is rotatably mounted, said front lever plates being pivotally mounted on said housing at points spaced forwardly from the axis of the respective front wheels said fixed distance, links respectively connecting the front and rear lever plates on each side of the housing and forming a parallel linkage including the links, wheels and lever plates, spring means effective on said parallel linkage and urging the linkage in a direction to raise said housing relative to said wheels to thereby partially counterbalance the weight of said housing and power unit, a bracket secured to the housing and having a portion overlying the central portion of said shaft, a generally upright bar pivotally mounted on said shaft and projecting upwardly through an opening in the overlying portion of said bracket, said opening permitting limited to and fro movement of said bar, said bar having a plurality of vertically spaced notches in its rear surface for receiving said bracket, a spring urging said bar rearwardly, said bar further having an offset portion beneath said notches which is engaged by the overlying portion of said bracket to limit downward movement of said housing, a pedal atop said bar for the application of foot pressure to bring said notches out of engagement with said bracket, and a handle pivotally connected to opposite sides of said housing and extending rearwardly of said foot pedal whereby an upward and rearward pull may be applied to the housing through the handle as a downward pressure is applied to the pedal to thereby with one movement bring the notches out of engagement with said bracket and raise the housing relative to all wheels simultaneously.

2. A rotary power lawn mower comprising a housing on which is mounted a power unit, a pair of rear wheels, a cross shaft rearwardly of said housing on the outer ends of which the rear wheels are rotatably mounted, a pair of lever plates secured to said shaft and pivotally mounted on either side of said housing on the same axis and at a fixed distance forwardly from the axis of said shaft, a pair of front wheels respectively disposed on either side of said housing, a lever plate on which each of the front wheels is rotatably mounted, said last named lever plates being pivotally mounted on said housing at points spaced forwardly from the axes of the respective front wheels said fixed distance, links respectively connecting the front and rear lever plates on each side of the housing and forming a parallel linkage including the links, wheels and lever plates, spring means effective on said parallel linkage and urging the linkage in a direction to raise said housing relative to said wheels to thereby partially counterbalance the weight of said housing and power unit, a bracket secured to the housing and having a portion overlying the central portion of said shaft, a generally upright bar pivotally mounted on said shaft, and projecting upwardly through an opening in the overlying portion of said bracket, said opening permitting limited to and fro movement of said bar, said bar having a plurality of vertically spaced notches in its rear surface for receiving said bracket, a spring urging said bar rearwardly, a pedal atop said bar for the application of foot pressure to bring said notches out of engagement with said bracket, and a handle pivotally connected to opposite sides of said housing and extending rearwardly of said foot pedal whereby an upward and rearward pull may be applied to the housing through the handle as a downward pressure is applied to the pedal to thereby with one movement bring the notches out of engagement with said bracket and raise the housing relative to all wheels simultaneously.

3. A rotary power lawn mower comprising a housing on which is mounted a power unit, a pair of rear wheels, a cross shaft rearwardly of said housing on the outer ends of which the rear wheels are rotatably mounted, a pair of lever plates secured to said shaft and pivotally mounted on either side of said housing on the same axis and at a fixed distance forwardly from the axis of said shaft, a pair of front wheels respectively disposed on either side of said housing, a lever plate on which each of the front wheels is rotatably mounted, said last-named lever plates being pivotally mounted on said housing at points spaced forwardly from the axes of the respective front wheels said fixed distance, links respectively connecting the front and rear lever plates on each side of the housing and forming a parallel linkage including the links, wheels and lever plates, a bracket secured to the housing and having a portion overlying said shaft, a generally upright bar pivotally mounted on said shaft and projecting upwardly through an opening in the overlying portion of said bracket, said bar having notches in its rear surface for receiving said bracket, a spring urging said bar rearwardly, a pedal atop said bar for the application of foot pressure to bring said notches out of engagement with said bracket and a handle pivotally connected to said housing whereby an upward pull may be applied to the latter as a downward pressure is applied to the pedal to thereby raise the housing relative to all wheels simultaneously.

4. A rotary power lawn mower comprising a housing on which is mounted a power unit, a pair of rear wheels, a cross shaft adjacent the rear of said housing on the outer ends of which the rear wheels are rotatably mounted, a pair of lever plates secured to said shaft and pivotally mounted on either side of said housing on the same axis and at a fixed distance forwardly from the axis of said shaft, a pair of front wheels respectively disposed on either side of said housing, a lever plate on which each of the front wheels is rotatably mounted, said last-named lever plates being pivotally mounted on said housing at points spaced forwardly from the axes of the respective front wheels said fixed distance, means interconnecting all of said lever plates forming a parallel linkage including the interconnecting means, the wheels, the shaft, and lever plates and which is arranged so that the weight of the power unit and housing tends to lower same, a bracket secured to said housing and having a portion overlying said shaft, a bar pivotally mounted on said shaft and projecting upwardly adjacent said bracket, said overlying portion of said bracket having a portion disposed rearwardly of said bar, said bar having notches in its rear face for receiving said bracket, a spring urging said bar rearwardly, a pedal atop said bar for the application of foot pressure to bring said notches out of engagement with said bracket and a handle pivotally connected to said housing whereby an upward pull may be applied to the latter as a downward pressure is applied to the pedal to thereby raise the housing relative to all wheels simultaneously.

5. A rotary mower as in claim 4 wherein spring means effective on said parallel linkage are provided for partially counterbalancing the weight of the power unit and housing.

6. A rotary mower comprising a housing, a plurality of supporting wheels on opposite sides of the housing, a plurality of lever plates on which said wheels are respectively rotatably mounted, means for pivotally mounting said lever plates on said housing forwardly of the axes of their respective wheels, means interconnecting said lever plates and forming a parallel linkage for simultaneous movement of all lever plates, said interconnecting means including a cross member rigidly secured to the rearmost lever plate on each side of said housing at points spaced rearwardly of the respective axes of pivotal connection between said rearmost lever plates and said housing, the weight of said housing tending to lower same relative to said wheels, a handle pivotally connected to opposite sides of said housing forwardly of the points of connection said cross member to said lever plates, said handle extending upwardly and rearwardly so that a pull may be exerted on the housing thereby to raise same as a downward pressure is exerted on the cross member and means for locking the housing in adjusted position.

7. A rotary lawn mower as in claim 6 wherein spring means effective on said parallel linkage are provided for partially counterbalancing the weight of said housing.

8. A rotary lawn mower as in claim 6 wherein the locking means include a generally upright ratchet-like member pivotally mounted on said cross member intermediate its length whereby the downward pressure can be applied to the cross member through the upright member, said upright member being releasably engageable with the housing and resilient means for urging said upright ratchet-like member rearwardly into locking engagement whereby the housing may be lowered an incremental distance by a forward kick on the ratchet-like member by the operator.

9. A rotary lawn mower comprising a housing on which a power unit is mounted to drive a cutting blade, a pair of wheels on each side of and supporting the housing, parallel linkage means interconnecting the wheels on each side of the housing and including a lever associated with each wheel, each said lever being pivotally attached to said housing, a cross member connecting the rearmost lever plate on each side of the housing, the wheels associated with said rearmost lever plates being journaled on said cross member, the remaining wheels being journaled on their associated lever plates, the pivotal connection of each lever plate relative to the housing being spaced forwardly of the axis of the journal of the wheel associated therewith, and a rearwardly and upwardly extending handle mounted on said housing forwardly of the said pivotal attachment of the rear wheel levers to the housing, whereby a downwardly and forwardly directed pressure by an operator's foot against said cross member may be exerted to hold the rear wheels in a stationary position and in opposition to a rearwardly and upwardly directed lifting movement of said handle so as to lift said housing and the rear wheel levers about the journals of said rear wheels, and means for releasably locking said housing at selected elevations relative to the wheels.

References Cited in the file of this patent

UNITED STATES PATENTS

| | | |
|---|---|---|
| 1,375,008 | Klock | Apr. 19, 1921 |
| 1,419,558 | Godin | June 13, 1922 |
| 1,677,011 | Adams | July 10, 1928 |
| 2,812,189 | Geldhof | Nov. 5, 1957 |
| 2,848,859 | Abel | Aug. 26, 1958 |

FOREIGN PATENTS

| | | |
|---|---|---|
| 248,128 | Switzerland | Jan. 16, 1948 |